(12) United States Patent
    Umezane

(10) Patent No.: US 11,220,213 B2
(45) Date of Patent: Jan. 11, 2022

(54) REAR DISPLAY DEVICE

(71) Applicant: SUZUKI MOTOR CORPORATION, Hamamatsu (JP)

(72) Inventor: Yuuichi Umezane, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 16/865,290

(22) Filed: May 1, 2020

(65) Prior Publication Data
    US 2020/0361376 A1      Nov. 19, 2020

(30) Foreign Application Priority Data

May 13, 2019  (JP) .............................. JP2019-090562

(51) Int. Cl.
    *B60R 1/00*      (2006.01)
    *H04N 5/225*     (2006.01)
    (Continued)

(52) U.S. Cl.
    CPC ............ *B60R 1/00* (2013.01); *G06K 9/00805* (2013.01); *H04N 5/2253* (2013.01);
    (Continued)

(58) Field of Classification Search
    CPC . B60R 1/00; B60R 2300/607; B60R 2300/10; B60R 2300/20; B60R 2300/305;
    (Continued)

(56) References Cited

U.S. PATENT DOCUMENTS 10,882,468 B1 *  1/2021  Czarnecki ............... E02F 3/431
2003/0197660 A1 * 10/2003  Takahashi .......... G06K 9/00791
                                                        345/7
(Continued)

FOREIGN PATENT DOCUMENTS

CN        102653259 B     11/2014
JP      2007034684 A  *   2/2007
(Continued)

OTHER PUBLICATIONS

French Office Action dated Jun. 9, 2021, issued by the French Patent Office in corresponding application FR 20 04532.
(Continued)

*Primary Examiner* — Richard A Hansell, Jr.
(74) *Attorney, Agent, or Firm* — Stein IP, LLC

(57) ABSTRACT

A rear display device includes a camera, a display and a controller. The controller generates an overhead view image by performing an overhead view conversion process, controls the display to display one of a non-overhead view image and the overhead view image, detects a movement state of the vehicle, predicts a reversing course of the vehicle, and detects an object that is present within a predetermined detection range at the rear. The controller controls the display to display the overhead view image when the object is at the reversing course and a distance between the object and the vehicle is a distance determination reference value or less. The controller controls the display to display the non-overhead view image when the object is not at the reversing course or the distance between the object and the vehicle is higher than the distance determination reference value.

3 Claims, 6 Drawing Sheets

(51) Int. Cl.
*H04N 5/262* (2006.01)
*G06K 9/00* (2006.01)

(52) U.S. Cl.
CPC ........ *H04N 5/2628* (2013.01); *B60R 2300/10* (2013.01); *B60R 2300/20* (2013.01); *B60R 2300/607* (2013.01)

(58) Field of Classification Search
CPC ...... B60R 2300/8093; B60R 2300/806; H04N 5/2253; H04N 5/2628; G06K 9/00805
See application file for complete search history.

(56) References Cited

U.S. PATENT DOCUMENTS

| | | | | |
|---|---|---|---|---|
| 2007/0057816 | A1* | 3/2007 | Sakakibara | B62D 15/0275 340/932.2 |
| 2012/0224059 | A1 | 9/2012 | Takamatsu | 348/148 |
| 2014/0118486 | A1* | 5/2014 | Luo | B60R 11/04 348/36 |
| 2015/0239437 | A1* | 8/2015 | Ignaczak | B60T 8/17558 701/70 |
| 2016/0021288 | A1* | 1/2016 | Chen | H04N 5/23245 348/148 |
| 2016/0176342 | A1* | 6/2016 | Yang | B60R 1/00 348/148 |

FOREIGN PATENT DOCUMENTS

| | | | |
|---|---|---|---|
| JP | 2010-124300 A | | 6/2010 |
| JP | 2010124300 A | * | 6/2010 |
| JP | 2012227699 A | * | 11/2012 |
| JP | 2013078151 A | * | 4/2013 |
| JP | 2016-30447 A | | 3/2016 |
| JP | 2017-5352 A | | 1/2017 |

OTHER PUBLICATIONS

"Guide d'utilisation Rifter" (Peugeot [FR]), 2018 (Apr. 2018), pp. 168-170.
Indian Office Action dated Jun. 23, 2021, issued by the Indian Patent Office in corresponding application IN 202014018712.

* cited by examiner

REAR DISPLAY DEVICE

CROSS-REFERENCE TO RELATED APPLICATIONS

The disclosure of Japanese Patent Application No. 2019-090562 filed on May 13, 2019, including specification, drawings and claims is incorporated herein by reference in its entirety.

BACKGROUND

The present invention relates to a rear display device that displays an image of rear of a vehicle.

There is known a technique of imaging rear of a vehicle by a camera and displaying an image obtained by the imaging on a display provided in the vehicle. According to this technique, when reversing the vehicle, a driver or the like of the vehicle can grasp a situation at rear of the vehicle in a wide range and can easily find an obstacle or the like that is present at the rear of the vehicle by viewing the image displayed on the display.

There is also known a technique of generating an overhead view image corresponding to the image obtained by imaging the rear of the vehicle by a camera and displaying the overhead view image on the display provided in the vehicle. According to this technique, the driver or the like of the vehicle may accurately grasp a distance between the vehicle and the obstacle by viewing the overhead view image. As a result, for example, in order to park the vehicle in a desired place, the driver or the like of the vehicle may easily perform advanced driving such as moving the vehicle to the desired place while reducing the distance between the vehicle and the obstacle.

The following Patent Literature 1 describes a rear view camera system that displays a rear view image imaged by a rear view camera on a monitor when the obstacle has not been detected within a predetermined distance from the vehicle and that displays the overhead view image obtained by performing an overhead view conversion process on the image imaged by the rear view camera on the monitor when the obstacle has been detected within the predetermined distance from the vehicle. According to this patent literature, the rear view image refers to an image obtained by performing a process of correcting distortion, a process of adjusting brightness, or the like on the imaged image while maintaining the same viewpoint direction, or refers to the imaged image on which these processes are not performed.

Patent Literature 1: JP-A-2010-124300

SUMMARY

According to an advantages aspect of the invention, there is provided a rear display device including:

a camera that is attached to a vehicle and is configured to capture rear of the vehicle;

a display configured to display an image; and a controller configured:

to generate an overhead view image by performing an overhead view conversion process on an image obtained by the camera;

to control the display to display one of a non-overhead view image in which the overhead view conversion process is not performed on the image obtained by the camera and the overhead view image;

to detect a movement state of the vehicle;

to predict a reversing course of the vehicle based on the movement state of the vehicle; and to detect an object that is present within a predetermined detection range at the rear of the vehicle, wherein the controller controls the display to display the overhead view image when the object is at the reversing course and a distance between the object and the vehicle is a distance determination reference value or less, and the controller controls the display to display the non-overhead view image when the object is not at the reversing course or the distance between the object and the vehicle is higher than the distance determination reference value.

DETAILED DESCRIPTION OF EXEMPLIFIED EMBODIMENTS

Figure 1:
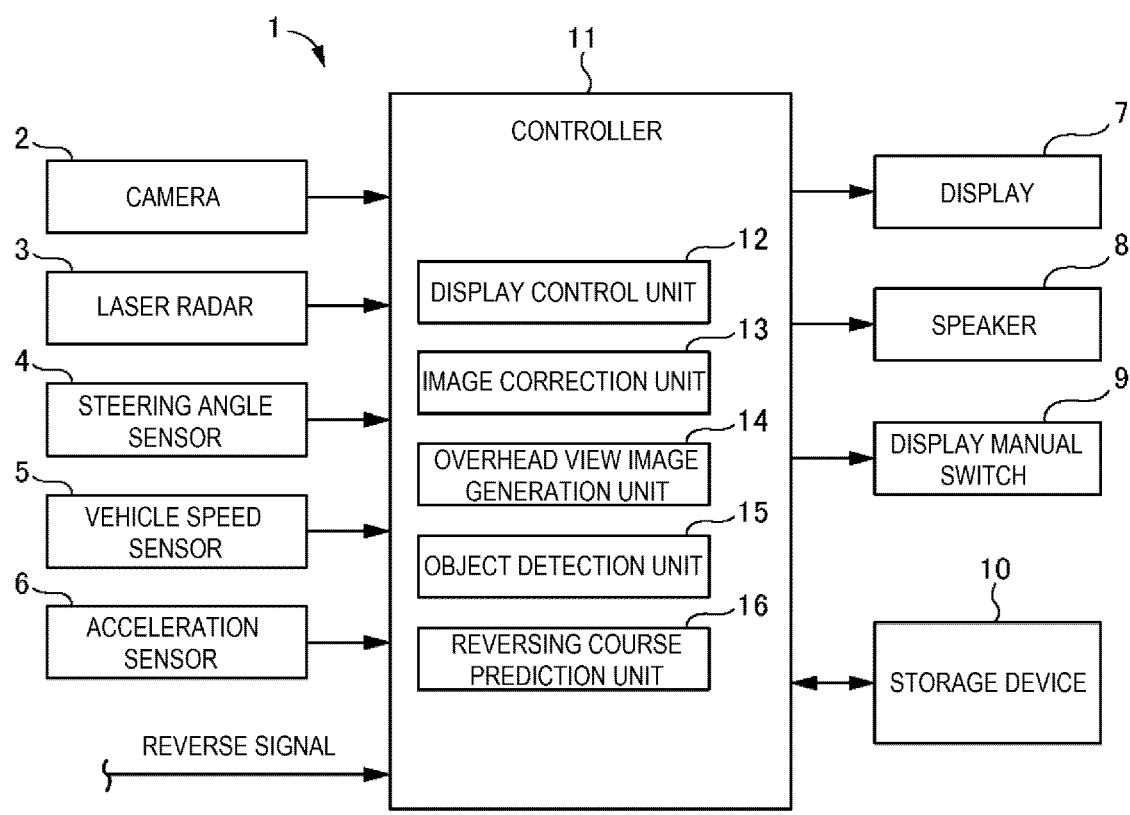
FIG. 1 is a block diagram showing a rear display device according to an embodiment of the present invention.

An image to be displayed on the display so as to facilitate determination of the situation of the rear of the vehicle by the occupant of the vehicle which is the driver of the vehicle or the like includes a normal image that is displayed when the rear of the vehicle is viewed from the same direction as the viewpoint direction of the camera, and the overhead view image that is displayed in a state in which the rear of the vehicle is viewed from right above. According to the normal image, the occupant of the vehicle can grasp the situation at the rear of the vehicle in the wide range. However, according to the normal image, it is difficult for the occupant of the vehicle to accurately grasp the distance between the vehicle and the obstacle. On the other hand, according to the overhead view image, the occupant of the vehicle can accurately grasp the distance between the vehicle and the obstacle. However, only a part of a rear region of the vehicle that is close to the vehicle is displayed in the overhead view image. Therefore, it is difficult for the occupant of the vehicle to grasp the situation at the rear of the vehicle in the wide range according to the overhead view image.

Here, when the obstacle that is likely to come into contact with the vehicle at a time of reversing of the vehicle is present, it is desirable to display the overhead view image on the display such that the occupant of the vehicle accurately grasps the distance between the obstacle and the vehicle to immediately avoid contact between the vehicle and the obstacle. On the other hand, when obstacles are present at the rear of the vehicle but none of those obstacles is likely to come into contact with the vehicle, it is desirable to display the normal image on the display, such that the occupant of the vehicle grasps the situation at the rear of the vehicle in the wide range to select a course of the vehicle such that a possibility of the contact between the vehicle and the obstacle does not increase.

In this respect, the rear view camera system described in Patent Literature 1 determines whether the rear view image in which the viewpoint direction is the same as the viewpoint direction in the imaged image is displayed on the monitor or the overhead view image is displayed on the monitor based on whether the obstacle is present within the predetermined distance from the vehicle. However, as in this system, it is difficult to appropriately determine which one of the rear view image and the overhead view image is to be displayed on the monitor based only on the distance between the vehicle and the obstacle.

That is, even when the obstacle is present within the predetermined distance from the vehicle, the vehicle is not likely to come into contact with the obstacle when the vehicle does not move in a direction in which the obstacle is present. In this case, it is possible to improve safety at the time of reversing of the vehicle by displaying the rearview image on the monitor to facilitate selection of the course of the vehicle, rather than displaying the overhead view image on the monitor.

Accordingly, the present invention has been made in view of the above circumstances, for example. An aspect of the present invention provides a rear display device capable of accurately determining that an image of rear of a vehicle to be displayed on a display to improve safety at a time of reversing of the vehicle is which one of a non-overhead view image (for example, the above-described normal image) and an overhead view image and appropriately performing switching between the non-overhead view image and the overhead view image.

A rear display device according to an embodiment of the present invention includes a camera, a display, an overhead view image generation unit, a display control unit, a movement state detection unit, a reversing course prediction unit, and an object detection unit.

The camera is attached to a vehicle and is configured to image rear of the vehicle. A display is provided, for example, in the vehicle and includes a screen on which an image is displayed.

The overhead view image generation unit is configured to generate an overhead view image by performing an overhead view conversion process on an image obtained by the camera. The overhead view image is an image that is displayed in a state in which the rear of the vehicle is viewed from right above.

The display control unit is configured to display any one of a non-overhead view image and the overhead view image on the display. The non-overhead view image is an image in which the overhead view conversion process is not performed on the image obtained by the camera. For example, the non-overhead view image is an image that is displayed in a state in which the rear of the vehicle is viewed from the same direction as a viewpoint direction of the camera.

The movement state detection unit is configured to detect a movement state of the vehicle. A moving direction, a speed, and acceleration of the vehicle each correspond to the movement state of the vehicle. A detection target of the movement state detection unit may be all of these, and may be, for example, only the moving direction of the vehicle. Any of a steering angle sensor, a vehicle speed sensor, an acceleration sensor, a gyro, and an inertia sensor can be used as the movement state detection unit. When the detection target of the movement state detection unit is only the moving direction of the vehicle, the movement state detection unit can be achieved only by the steering angle sensor.

The reversing course prediction unit is configured to predict a reversing course of the vehicle based on the movement state of the vehicle detected by the movement state detection unit.

The object detection unit is configured to detect an object that is present within a predetermined detection range at the rear of the vehicle. Any of a laser radar (or alight detection and ranging (LIDAR)), an ultrasonic sensor, and a stereo camera can be used as the object detection unit.

The display control unit displays the overhead view image on the display when the object detected by the object detection unit is at the reversing course of the vehicle predicted by the reversing course prediction unit and a distance between the object and the vehicle is a distance determination reference value or less. On the other hand, the display control unit displays the non-overhead view image on the display when the object detected by the object detection unit is not at the reversing course of the vehicle predicted by the reversing course prediction unit or the distance between the object detected by the object detection unit and the vehicle is higher than the distance determination reference value.

Accordingly, in the rear display device according to the embodiment of the present invention, the overhead view image is displayed on the display when both of a condition that the object present within the predetermined detection range at the rear of the vehicle is at the predicted reversing course of the vehicle and a condition that the distance between the object present within the predetermined detection range at the rear of the vehicle and the vehicle is the distance determination reference value or less, and the non-overhead view image is displayed on the display when any one of these conditions is not satisfied or none of these conditions is satisfied.

For example, even when the distance between the object, which is an obstacle present at the rear of the vehicle or the like, and the vehicle is short, the vehicle and the object are not likely to come into contact with each other when the object is not at the predicted reversing course of the vehicle. According to the rear display device in the present embodiment, in this case, the non-overhead view image is displayed on the display, such that an occupant of the vehicle grasps a situation at the rear of the vehicle in a wide range to select a course of the vehicle such that a possibility of contact between the vehicle and the obstacle does not increase.

On the other hand, when the distance between the object that is present at the rear of the vehicle and the vehicle is short and the object is at the predicted reversing course of the vehicle, the possibility of the contact between the vehicle and the object increases. According to the rear display device in the present embodiment, in this case, the overhead view image is displayed on the display, such that the occupant of the vehicle can accurately grasp the distance between the object and the vehicle and can immediately avoid the contact between the vehicle and the object.

As described above, according to the rear display device in the present embodiment, it is possible to precisely determine whether to display the overhead view image on the display and to appropriately perform switching between the non-overhead view image and the overhead view image, in terms of determining whether to display the overhead view image on the display based not only on the distance between the vehicle and the object but also on whether the object is at the predicted reversing course of the vehicle, as compared with a related-art technique of determining whether to display the overhead view image on the display based only on the distance between the vehicle and the object.

(Rear Display Device)

FIG. 1 shows a rear display device 1 according to the embodiment of the present invention. As shown in FIG. 1, the rear display device 1 includes a camera 2, a laser radar 3, a steering angle sensor 4, a vehicle speed sensor 5, an acceleration sensor 6, a display 7, a speaker 8, a display manual switch 9, a storage device 10, and a controller 11.

The camera 2 is configured to capture rear of a vehicle. The camera 2 is a monocular camera, and includes a lens having a wide angle of view of, for example, approximately 90 degrees to 190 degrees. The camera 2 can continuously capture the rear of the vehicle at a frame rate of, for example, 24 frame per second (fps) to 60 fps. For example, while an electric system of the vehicle is operating, the camera 2 constantly captures the rear of the vehicle. An image obtained by capturing with the camera 2 is stored in the storage device 10. The camera 2 is attached to a rear part of the vehicle. The camera 2 is provided, for example, between a rear bumper and a rear window of the vehicle. The camera 2 may be provided near an upper part of the rear window. The camera 2 is provided at a center of the vehicle in a left-right direction of the vehicle.

The laser radar 3 is configured to detect an object that is present at the rear of the vehicle. The laser radar 3 irradiates the object with a laser, receives reflected light of the laser with which the object is irradiated, and detects the distance between the vehicle and the object based on time from the irradiation with the laser to the reception of the light. The laser radar 3 can detect the distance between the object that is present at the rear of the vehicle in the wide range and the vehicle by sweeping the laser. For example, while the electric system of the vehicle is operating, the laser radar 3 constantly performs the sweeping irradiation with the laser. The laser radar 3 is attached to the rear part of the vehicle. Similarly to the camera 2, the laser radar 3 is provided between the rear bumper and the rear window of the vehicle, near the upper part of the rear window, or the like. The laser radar 3 is provided at the center of the vehicle in the left-right direction. A range in which the object that is present at the rear of the vehicle is detected by the laser radar 3 is, for example, 180 degrees in a horizontal direction and 30 degrees in a vertical direction. Hereinafter, this range is referred to as "an object detection range".

The steering angle sensor 4, the vehicle speed sensor 5, and the acceleration sensor 6 are configured to detect a movement state of the vehicle. The movement state of the vehicle includes a moving direction of the vehicle, a speed of the vehicle, and acceleration of the vehicle. The steering angle sensor 4 is configured to detect a steering angle of a steering wheel of the vehicle. The moving direction of the vehicle can be detected based on a detection result obtained by the steering angle sensor 4. The vehicle speed sensor 5 is configured to detect the speed of the vehicle. The acceleration sensor 6 is configured to detect the acceleration of the vehicle. These devices are provided at the vehicle. The steering angle sensor 4, the vehicle speed sensor 5, and the acceleration sensor 6 each are a specific example of a "movement state detection unit" in the claims.

The display 7 is configured to display an image, and includes a screen on which the image is displayed. The display 7 is, for example, a liquid crystal display or an organic electroluminescence display. The display 7 is attached to, for example, a dashboard in the vehicle such that the occupant of the vehicle which is a driver of the vehicle or the like can view the image. The speaker 8 is configured to output sound, and is provided in the vehicle.

The display manual switch 9 is configured to manually switch the image displayed on the display 7 by the occupant of the vehicle. The display manual switch 9 is provided, for example, in a vicinity of the display 7.

The storage device 10 is configured to store a program, data, and the like necessary for the rear display device 1 to perform a rear display process (described below), and is provided in the vehicle. The storage device 10 is a semiconductor storage device including a semiconductor storage element which is a flash memory or the like. A magnetic storage device which is a hard disk drive or the like can be used as the storage device 10.

The controller 11 includes a central processing unit (CPU) and the like, and is provided in the vehicle. The controller 11 functions as a display control unit 12, an image correction unit 13, an overhead view image generation unit 14, an object detection unit 15, and a reversing course prediction unit 16 by reading and executing the program stored in the storage device 10.

The display control unit 12 has a function of controlling displaying of the display 7. The display control unit 12 is configured to perform control to switch the image to be displayed on the display 7. The display control unit 12 determines whether a predetermined condition (described below) is satisfied, and selects the image to be displayed on the display 7 from a normal image and an overhead view image based on a determination result thereof. Here, the "normal image" is an image that is displayed in a state in which the rear of the vehicle is viewed from the same direction as a viewpoint direction of the camera 2. The "overhead view image" is an image that is displayed in a state in which the rear of the vehicle is viewed from right above. The normal image is an image in which an overhead view conversion process is not performed on the image obtained by the camera 2, and the overhead view image is an image obtained by performing the overhead view conversion process on the image obtained by the camera 2. The normal image is a specific example of a "non-overhead view image" in the claims.

The image correction unit 13 has a function of correcting the normal image. Specifically, the image correction unit 13 is configured to perform correction of removing distortion of the normal image caused by a wide angle of view of a lens of the camera 2.

The overhead view image generation unit 14 has a function of generating the overhead view image by performing the overhead view conversion process on the image obtained by the camera 2. A well-known method can be used as an overhead view conversion method.

The object detection unit 15 has a function of detecting the object that is present within the object detection range. The object detection unit 15 is configured to detect the distance between the object that is present at the rear of the vehicle and the vehicle and a position of the object based on an irradiation angle with the laser from the laser radar 3, the time from the irradiation with the laser to the reception of the reflected light, and the like.

The reversing course prediction unit 16 has a function of predicting the reversing course of the vehicle, that is, the course of the reversing vehicle or a movement trajectory of the reversing vehicle, based on the steering angle (the moving direction of the vehicle) of the steering wheel detected by the steering angle sensor 4, the speed of the vehicle detected by the vehicle speed sensor 5, and the vehicle acceleration detected by the acceleration sensor 6.

As shown in FIG. 1, the controller 11 is electrically connected with the camera 2, the laser radar 3, the steering angle sensor 4, the vehicle speed sensor 5, the acceleration sensor 6, the display 7, the speaker 8, the display manual switch 9, and the storage device 10. A reverse signal indicating that a vehicle gear has been switched to reverse is input to the controller 11.

(Rear Display Process)

Figure 2:
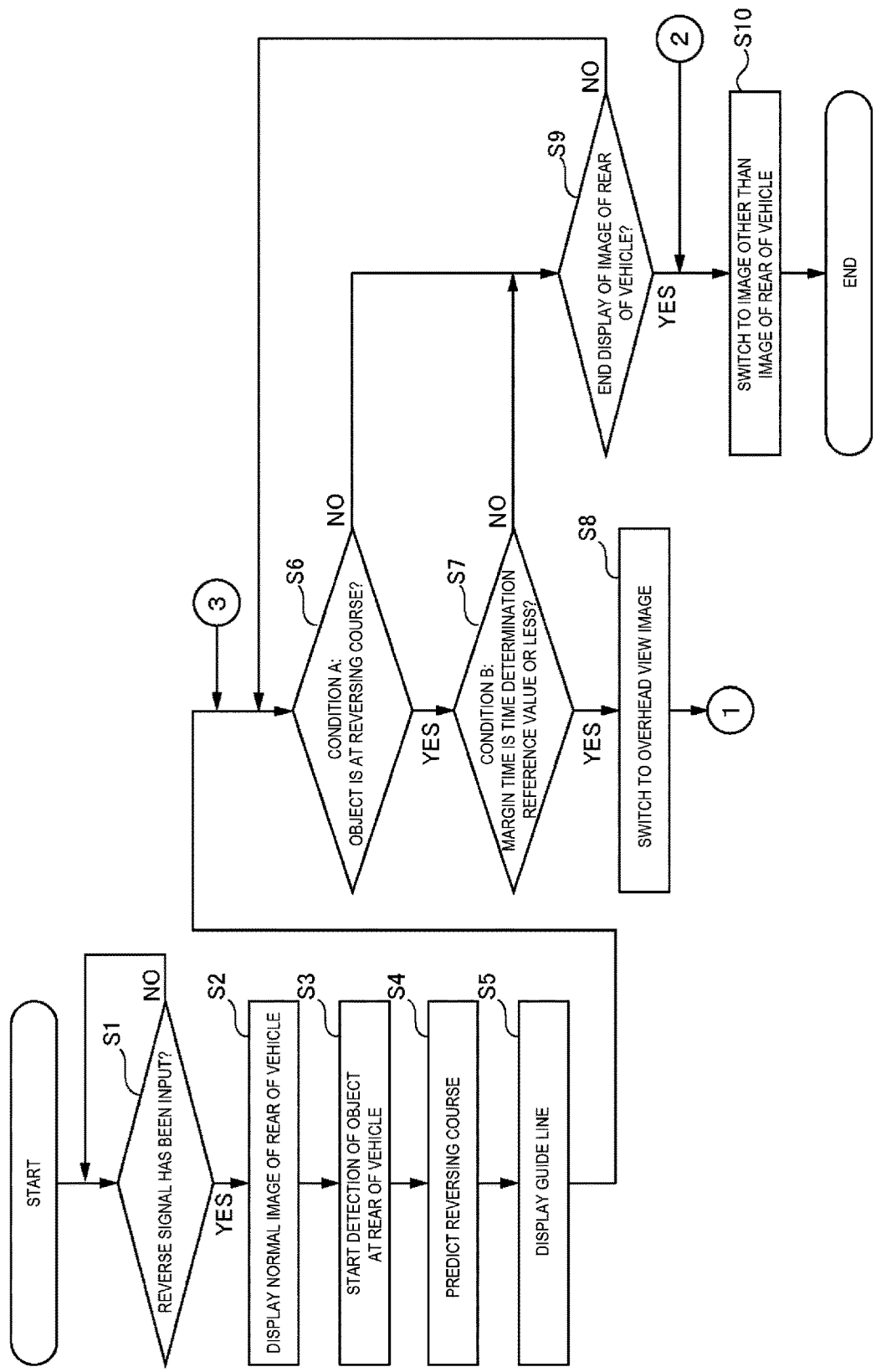
FIG. 2 is a flowchart showing a rear display process performed by the rear display device according to the embodiment of the present invention.
Figure 3:
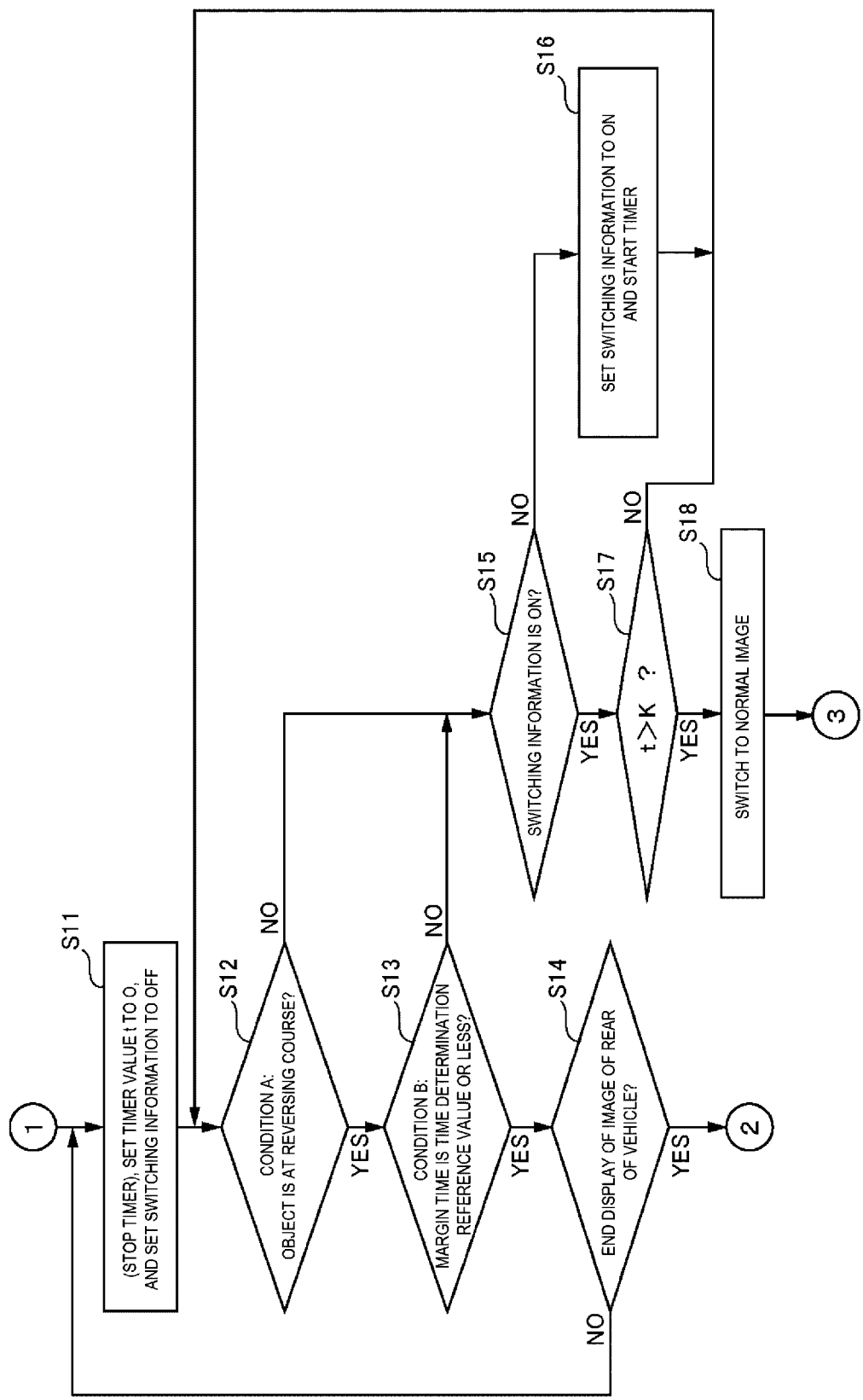
FIG. 3 is a flowchart showing a rear display process following that in FIG. 2.
Figure 4:
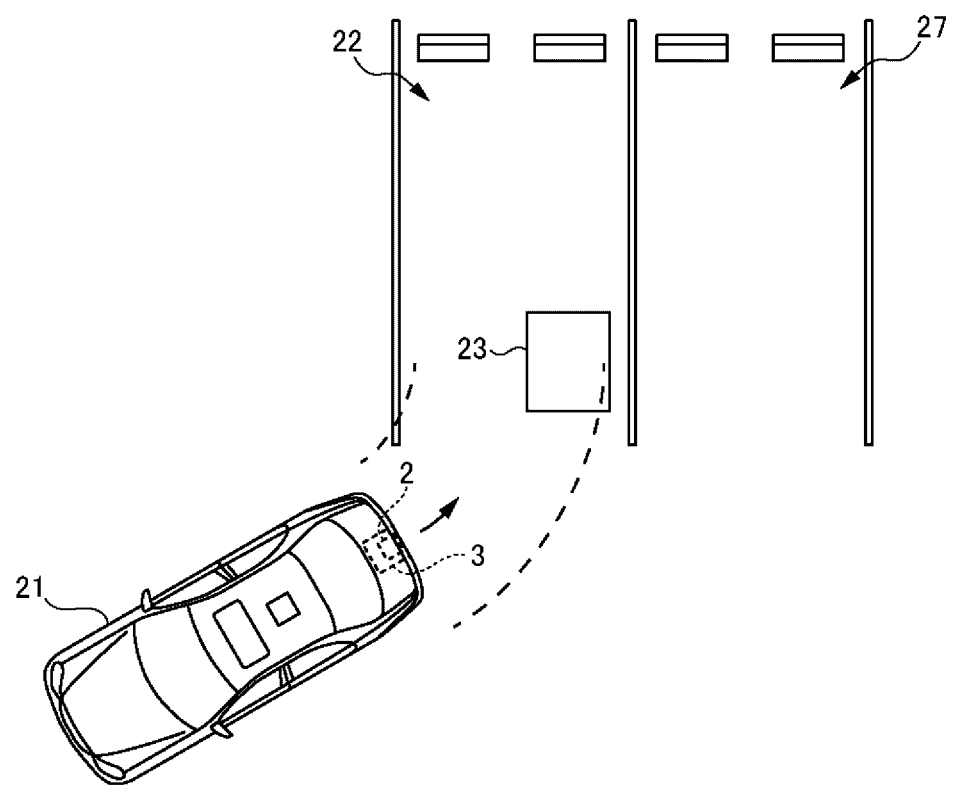
FIG. 4 is an illustrative view illustrating a state in which a vehicle is to be reversed to enter a parking space where an object is present.
Figure 5:
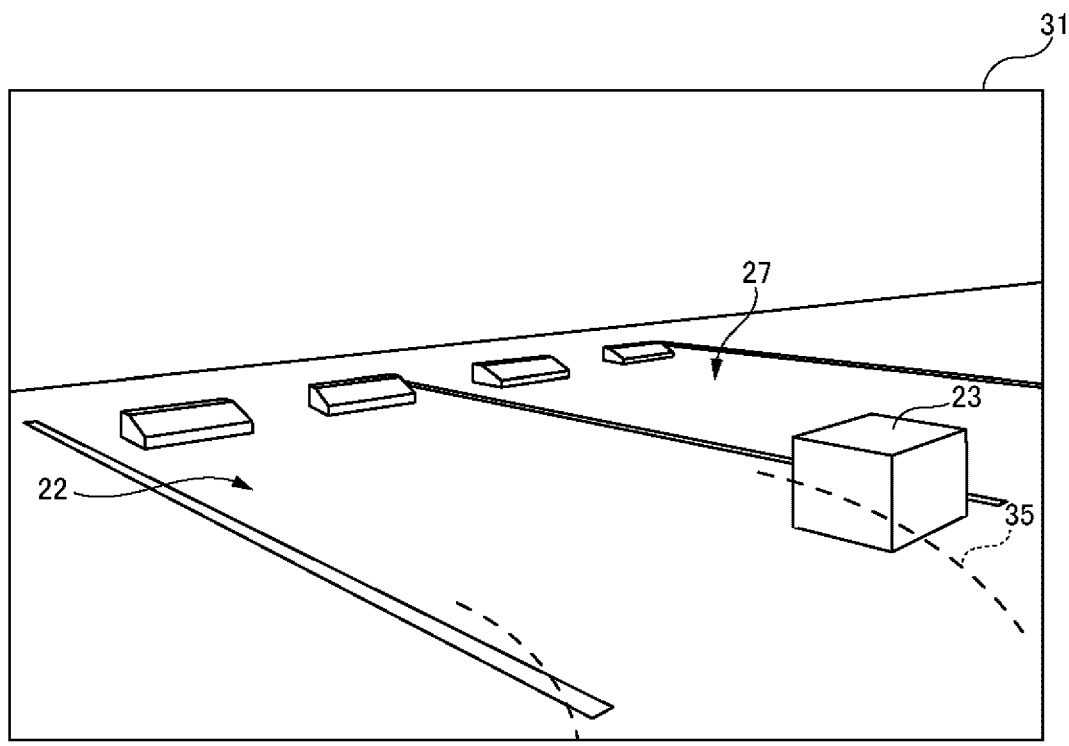
FIG. 5 is an illustrative view illustrating an example of a normal image displayed on a display of the vehicle in FIG. 4.
Figure 6:
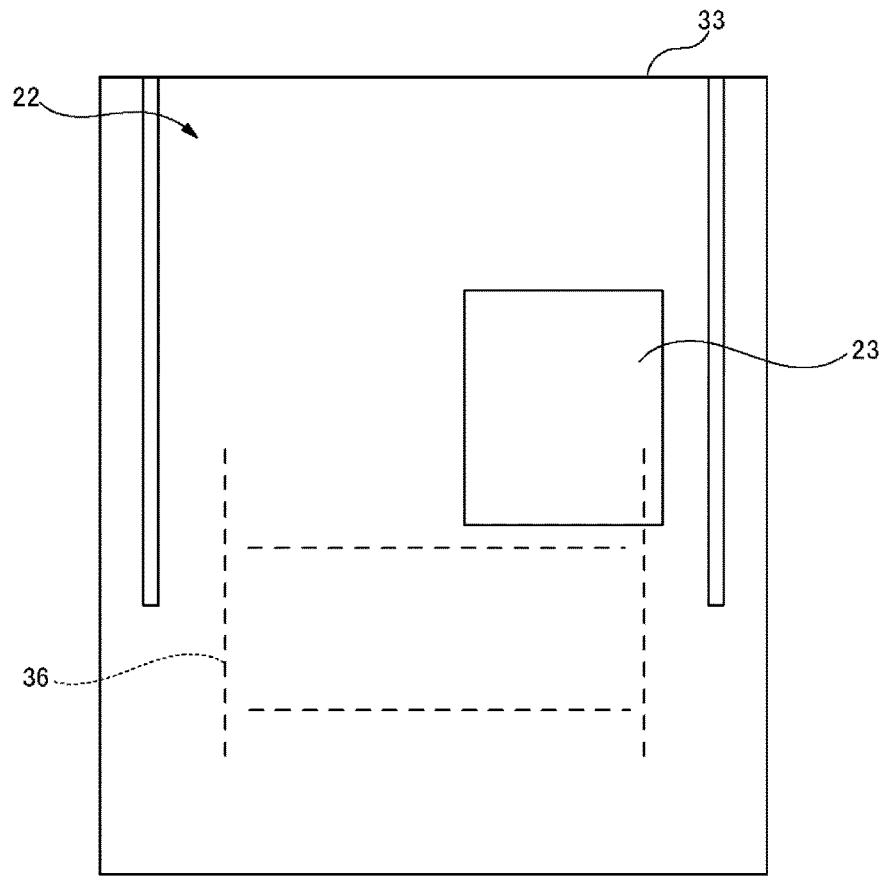
FIG. 6 is an illustrative view illustrating an example of an overhead view image displayed on the display of the vehicle in FIG. 4.
Figure 7:
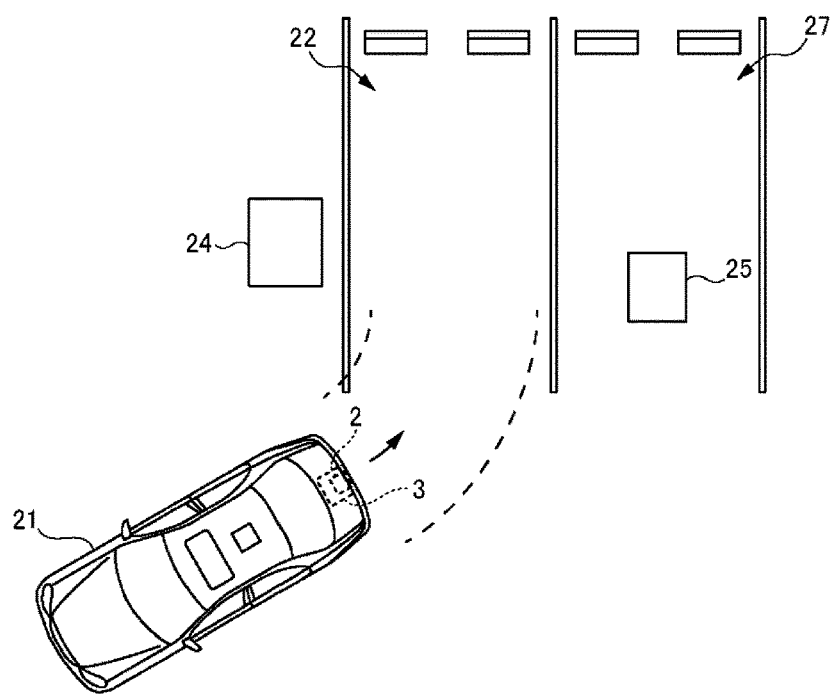
FIG. 7 is an illustrative view illustrating a state in which the vehicle is to be reversed to enter the parking space where no object is present.
Figure 8:
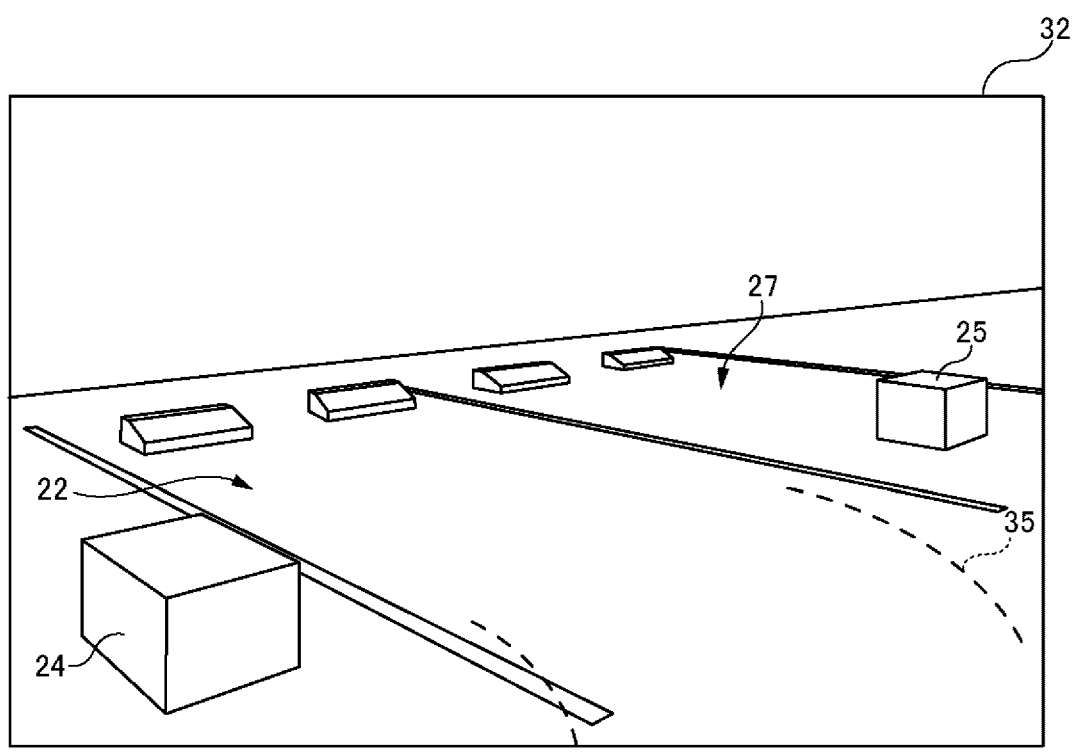
FIG. 8 is an illustrative view illustrating an example of a normal image displayed on the display of the vehicle in FIG. 7.

FIGS. 2 and 3 show a rear display process performed by the rear display device 1. FIG. 4 illustrates a state in which a vehicle 21 is to be reversed to enter a parking space 22 where an object 23 is present. FIG. 5 illustrates a normal image 31 displayed on a display 7 of the vehicle 21 in FIG. 4. FIG. 6 illustrates an overhead view image 33 displayed on the display 7 of the vehicle 21 in FIG. 4. FIG. 7 illustrates a state in which the vehicle 21 is to be reversed to enter the parking space 22 where no object is present. FIG. 8 illustrates a normal image 32 displayed on the display 7 of the vehicle 21 in FIG. 7. Hereinafter, a case in which the vehicle 21 is to be reversed to enter the parking space 22 where the object 23 is present as shown in FIG. 4 and a case in which the vehicle 21 is to be reversed to enter the parking space 22 where no object is present as shown in FIG. 7 will be used as examples to describe the rear display process performed by the rear display device 1.

The rear display process shown in FIGS. 2 and 3 is started when the gear of the vehicle 21 is switched to reverse. That is, when the gear of the vehicle 21 has been switched to reverse and the reverse signal has been input to the controller 11, the display control unit 12 recognizes that the reverse signal has been input (step S1: YES), and displays the image of the rear of the vehicle 21 on the display 7. In this case, the display control unit 12 displays the normal image on the display 7 (step S2). The normal image is obtained by removing the distortion by the image correction unit 13. The images continuously acquired by continuous capturing with the camera 2 are successively corrected by the image correction unit 13, and are displayed on the display 7. Accordingly, a video showing the rear of the vehicle is displayed on the display 7.

Subsequently, the object detection unit 15 starts detection of the object that is present at the rear of the vehicle 21, that is, the object detection unit 15 starts detection of the object that is present in the object detection range (step S3). Accordingly, for example, information (hereinafter, referred to as "vehicle-object distance information") indicating the distance between the object that is present in the object detection range and the vehicle 21 and information (hereinafter, referred to as "object position information") indicating the position of the object that is present in the object detection range are stored in the storage device 10.

Subsequently, the reversing course prediction unit 16 predicts the reversing course of the vehicle 21 (step S4). Accordingly, for example, information (hereinafter, referred to as "predicted movement range information") indicating a range of a region in which the vehicle 21 is predicted to be reversed and moved is stored in the storage device 10.

Subsequently, the reversing course prediction unit 16 displays a guide line indicating the reversing course of the vehicle 21 in the normal image so as to assist a driver of the vehicle 21 in driving (step S5).

As illustrated in FIG. 4, when the vehicle 21 is to be reversed to enter the parking space 22 where the object 23 is present, the normal image 31 as illustrated in FIG. 5 is displayed on the display 7. The normal image 31 shows the object 23 that is present in the parking space 22. In the normal image 31, guide lines 35 indicating the reversing course of the vehicle 21 are superimposed and displayed. As illustrated in FIG. 7, when the vehicle 21 is to be reversed to enter the parking space 22 where no object is present, the normal image 32 as illustrated in FIG. 8 is displayed on the display 7. In FIG. 7, no object is present in the parking space 22 where the vehicle 21 is to enter. However, in FIG. 7, an object 24 is present at outside of the parking space 22 and on left of the parking space 22, and an object 25 is present in a parking space 27 adjacent to the parking space 22 and on right of the parking space 22. The normal image 32 shown in FIG. 7 show these objects 24, 25. Also in the normal image 32, the guide lines 35 indicating the reversing course of the vehicle 21 are superimposed and displayed.

Subsequently, the display control unit 12 determines whether the following two conditions are satisfied (steps S6, S7 in FIG. 2).

Condition A: The object detected by the object detection unit 15 is at the predicted reversing course of the vehicle 21.

Condition B: Margin time for the object detected by the object detection unit 15 and the vehicle 21 is a time determination reference value or less.

Determination of the condition A can be performed by comparing the object position information stored in the storage device 10 in step S3 with the predicted movement range information stored in the storage device 10 in step S4.

The "margin time" in the condition B means time taken from current time until collision between the object and the vehicle. This concept is referred to as time to collision (TTC). The margin time is calculated using a moving speed of the vehicle, a moving speed of the object, and the distance between the object and the vehicle at the current time. The moving speed of the vehicle can be obtained based on a vehicle speed signal obtained from the vehicle speed sensor. The speed of the object can be obtained by detecting a change of the object in distance per unit time by the laser radar 3, and comparing a detection result with the moving speed of the vehicle. When the object is, for example, a falling rock, a curb, a wheel clasp, a pylon, a building, a workpiece, a tree, or the like, the object does not normally move. However, when the object is an animal, a light object that flies by wind, or the like, the object may move. The distance between the object and the vehicle can be obtained using the vehicle-object distance information stored in step S3. The margin time can be calculated by the following equation (1) in which, for example, the moving speed of the vehicle is v1, the moving speed of the object is v2, and the distance between the object and the vehicle is d.

$$d/|v1-v2| \qquad (1)$$

The "time determination reference value" in the condition B is, for example, a preset value. The time determination reference value is set to time sufficient for the driver of the vehicle to avoid contact between the vehicle and the object, for example, approximately 3 seconds to 10 seconds.

When both of the condition A and the condition B are satisfied as a result of determination by the display control unit 12 (step S6: YES and step S7: YES), the display control unit 12 switches the image to be displayed on the display 7 from the normal image to the overhead view image (step S8). That is, when both of the condition A and the condition B are satisfied, the images continuously acquired by the continuous capturing with the camera 2 are successively converted into the overhead view images by the overhead view image generation unit 14 and displayed on the display 7. When the image displayed on the display 7 is switched from the normal image to the overhead view image, a warning sound may be output from the speaker 8 to notify the occupant of the vehicle 21 that the vehicle 21 has approached the object on the reversing course.

On the other hand, when the condition A is not satisfied (step S6: NO) or when the condition B is not satisfied (step S7: NO) as a result of the determination by the display control unit 12, the display control unit 12 maintains a state in which the normal image is displayed on the display 7.

As illustrated in FIG. 4, in the case in which the object 23 is at the predicted reversing course of the vehicle 21, when the vehicle 21 moves further rearward from a state shown in FIG. 4 and the margin time for the vehicle 21 and the object 23 becomes the time determination reference value or less, the image displayed on the display 7 is switched from the normal image 31 illustrated in FIG. 5 to the overhead view image 33 illustrated in FIG. 6. As illustrated in FIG. 6, also in the overhead view image 33, guidelines 36 for assisting the driver of the vehicle 21 in driving are superimposed and displayed. On the other hand, as illustrated in FIG. 7, when the object is not at the predicted reversing course of the vehicle 21, the image displayed on the display 7 remains the normal image. The object 24 and the object 25 in FIG. 7 are respectively at rear peripheries of the vehicle 21, but are not at the predicted reversing course of the vehicle 21. Accordingly, when the object is not at the predicted reversing course of the vehicle 21, even if the object is present at the rear periphery of the vehicle 21, the image on the display 7 is not switched to the overhead view image.

In the rear display device 1, the occupant of the vehicle 21 can operate the display manual switch 9 to switch the image displayed on the display 7 to any image. In the state in which the normal image is displayed on the display 7, when the occupant of the vehicle 21 operates the display manual switch 9 to switch the image displayed on the display 7 to an image other than the image (the normal image or the overhead view image) of the rear of the vehicle 21 (step S9 in FIG. 2: YES), the display control unit 12 ends the rear display process after switching the image displayed on the display 7 in accordance with the operation of the display manual switch 9 (step S10).

In step S8 in FIG. 2, after switching the image to be displayed on the display 7 from the normal image to the overhead view image, the display control unit 12 continues to display the overhead view image 33 or returns the overhead view image to the normal image as shown in FIG. 3. That is, first, the display control unit 12 initializes a timer provided in the controller 11. A timer value t of the timer is set to 0 by the initialization of the timer. The display control unit 12, for example, sets switching information stored in a memory or the storage device 10 provided in the controller 11 to off (step S11).

Subsequently, the display control unit 12 determines whether the condition A and the condition B are satisfied (steps S12, S13). When both of the condition A and the condition B are satisfied (step S12: YES and step S13: YES), the display control unit 12 continues to display the overhead image on the display 7.

In the state in which the overhead view image is displayed on the display 7, when the occupant of the vehicle 21 operates the display manual switch 9 to switch the image displayed on the display 7 to an image other than the image (the normal image or the overhead view image) of the rear of the vehicle 21 (step S14: YES), the display control unit 12 ends the rear display process after switching the image displayed on the display 7 in accordance with the operation of the display manual switch 9 (step S10 in FIG. 2).

On the other hand, when the condition A is not satisfied in step S12 (step S12 in FIG. 3: NO) or when the condition B is not satisfied in step S13 (step S13: NO), the display control unit 12 determines whether the switching information is on. When the switching flag is off (step S15: NO), the display control unit 12 sets the switching information to on and starts the timer (step S16). When the timer starts, the timer value t increases with passage of time. When the condition A is not satisfied and the switching information is on (step S12: NO and step S15: YES) or when the condition B is not satisfied and the switching information is on (step S13: NO and step S15: YES), the display control unit 12 determines whether the timer value t has exceeded display holding time K. When the timer value t has exceeded the display holding timeK (step 17: YES), the display control unit 12 switches the image to be displayed on the display 7 from the overhead view image to the normal image (step S18). Thereafter, the display control unit 12 stops the timer, and then shifts the process to step S6 in FIG. 2. The display holding time K is set to, for example, approximately 1 second to 2 seconds.

The following control is achieved by the above-described processes of steps S11 to S13 and S15 to S18. That is, after the image to be displayed on the display 7 is switched from the normal image to the overhead view image, when the object detected by the object detection unit 15 is no longer at the predicted reversing course of the vehicle 21 or when the margin time for the object detected by the object detection unit 15 and the vehicle 21 has become higher than the time determination reference value, the display control unit 12 switches the overhead view image to the normal image after this state continues for the display holding time K instead of immediately switching the overhead view image to the normal image.

Before the above-described state continues for the display holding time K, when the object detected by the object detection unit 15 is at the predicted reversing course of the vehicle 21 and the margin time for the object and the vehicle 21 has become the time determination reference value or less, the display control unit 12 stops the timer, resets the timer value t to 0, and resets the switching information to off in step S11. Accordingly, a state of the rear display process returns to the state when the image to be displayed on the display 7 has been switched to the overhead view image for the first time in step S8 in FIG. 2.

For example, the object that is present at the rear of the vehicle 21 is a moving object. When the vehicle 21 is reversed to enter the parking space 22, there may be a case in which and the object enters or leaves the predicted reversing course of the vehicle 21 or a case in which the object approaches or moves away from the vehicle 21. According to the control achieved by the processes of steps S11 to S13 and S15 to S18, it is possible to prevent the image displayed on the display 7 from being frequently switched between the overhead view image and the normal image by the movement of the object and to prevent the display of the display 7 from becoming difficult to be seen.

As described above, in the rear display device 1 according to the embodiment of the present invention, the overhead view image is displayed on the display 7 when both of the condition that the object that is present at the rear of the vehicle 21, specifically, the object that is present in the object detection range is at the predicted reversing course of the vehicle 21 and the condition that the margin time for the object and the vehicle 21 is the time determination reference value or less are satisfied, and the normal image is displayed on the display 7 when any one of these conditions is not satisfied or none of these conditions is satisfied. That is, even when the distance between the object that is present at the rear of the vehicle 21 and the vehicle 21 is short, the vehicle 21 is not likely to come into contact with the object when the object is not at the predicted reversing course of the vehicle. In this case, the normal image is displayed on the display 7. Accordingly, the occupant of the vehicle grasps a situation at the rear of the vehicle 21 in a wide range to select a course of the vehicle 21 such that a possibility of contact between the vehicle 21 and the object does not increase. On the other hand, when the distance between the object that is present at the rear of the vehicle 21 and the vehicle is short and the object is at the predicted reversing course of the vehicle 21, the possibility that the vehicle 21 comes into contact with the object increases. In this case, the overhead view image is displayed on the display 7. Accordingly, the occupant of the vehicle can accurately grasp the distance between the object and the vehicle 21 and can immediately avoid the contact between the vehicle 21 and the object. Accordingly, in the rear display device 1 according to the present embodiment, it is possible to accurately determine which of the normal image and the overhead view image is to be displayed on the display 7 based on the two conditions, and to appropriately perform the switching between the normal image and the overhead view image.

In the rear display device 1 according to the present embodiment, it is determined whether to switch the image to be displayed on the display 7 from the normal image to the overhead view image based on the margin time for the object that is present in the object detection range and the vehicle 21. The margin time is a value calculated using not only the distance between the vehicle 21 and the object but also the moving speed of each of the vehicle 21 and the object, as shown in the above equation (1). Therefore, it is possible to determine a degree of the possibility of the contact between the vehicle 21 and the object with high accuracy based on the margin time. Therefore, it is possible to improve accuracy of determining whether to switch the image displayed on the display 7 from the normal image to the overhead view image by determining whether to switch the image displayed on the display 7 from the normal image to the overhead view image based on the margin time for the object that is present in the object detection range and the vehicle 21.

In the above-described embodiment, the example has been described in which it is determined whether to display the normal image or the overhead view image on the display 7 based on the margin time for the object that is present in the object detection range and the vehicle 21. However, the present invention is not limited thereto. It may be determined whether to display the normal image or the overhead view image on the display 7 based on the distance between the vehicle and the object. In this case, when the determination is performed based on the distance between the vehicle and the object, the moving speed of each of the vehicle and the object is taken into consideration. Specifically, the condition B is that the distance between the object detected by the object detection unit 15 and the vehicle 21 is the distance determination reference value or less. The distance determination reference value changes according to the speed of the vehicle 21 or the speed of the object detected by the object detection unit 15. For example, the distance determination reference value is calculated by the following equation (2).

$$T \cdot |v1 - v2| \quad (2)$$

In the equation (2), v1 is the moving speed of the vehicle 21, v2 is the moving speed of the object, and T is time (for example, approximately 3 seconds to 10 seconds) sufficient for the driver of the vehicle 21 to avoid the contact between the vehicle 21 and the object. According to this method, the same effect as those according to the above-described embodiment can be attained.

In the above-described embodiment, the moving speed of the object may not be taken into consideration when the margin time for the object detected by the object detection unit 15 and the vehicle 21 is calculated or the above-described distance determination reference value is calculated.

A predetermined value indicating the distance between the object and the vehicle may be simply used as the distance determination reference value without considering both of the moving speed of the vehicle and the moving speed of the object when the above-described distance determination reference value is determined. For example, the distance determination reference value may be set to 1 m, 1.5 m, or 2 m.

Acceleration of the vehicle 21 may be taken into consideration when the margin time for the object detected by the object detection unit 15 and the vehicle 21 or the distance determination reference value between the object detected by the object detection unit 15 and the vehicle 21 is calculated. The acceleration of the vehicle 21 can be detected by the acceleration sensor 6.

In the above-described embodiment, the example has been described in which the normal image obtained by removing the distortion by the image correction unit 13 is displayed on the display 7. However, the image obtained by capturing with the camera 2 may be displayed as the normal image on the display 7 without removing the distortion.

In the above-described embodiment, the example has been described in which the laser radar is used to detect the object that is present at the rear of the vehicle 21. However, an ultrasonic sensor may be used to detect the object that is present at the rear of the vehicle 21. In this case, in order to widen the range in which the object that is present at the rear of the vehicle 21 can be detected, it is preferable to provide a plurality of ultrasonic sensors at intervals in the rear part of the vehicle in the left-right direction.

FIGS. 4 and 7 used in the description of the above-described embodiment illustrate a situation in which a four-wheeled vehicle is to enter the parking space. However, the vehicle on which the rear display device according to the present invention is mounted is not limited to the four-wheeled vehicle. The rear display device according to the present invention can also be used other than when the vehicle is parked.

The present invention can be modified as appropriate without departing from the scope or spirit of the invention which can be read from the claims and the entire specification, and the rear display device with these modifications is also contained in the technical idea of the present invention.

According to the present invention, it is possible to accurately determine that the image of the rear of the vehicle to be displayed on the display to improve safety at a time of reversing of the vehicle is which one of the non-overhead view image and the overhead view image and to appropriately perform switching between the non-overhead view image and the overhead view image.

The invention claimed is:

1. A rear display device comprising: a camera that is attached to a vehicle and is configured to capture rear of the vehicle; a display configured to display an image; and a controller configured: to generate an overhead view image by performing an overhead view conversion process on an image obtained by the camera; to control the display to display one of a non-overhead view image in which the overhead view conversion process is not performed on the image obtained by the camera and the overhead view image; to detect a movement state of the vehicle; to predict a reversing course of the vehicle based on the movement state of the vehicle; and to detect an object that is present within a predetermined detection range at the rear of the vehicle, wherein the controller controls the display to display the overhead view image when the object is at the reversing course and a distance between the object and the vehicle is a distance determination reference value or less, the controller controls the display to display the non-overhead view image when the object is not at the reversing course or the distance between the object and the vehicle is higher than the distance determination reference value, and the controller switches an image displayed on the display to the non-overhead view image when the value of a timer exceeds a predetermined time after the controller starts the timer from a time point when the object at the reversing course is not at the reversing course or the distance between the object at the reversing course and the vehicle becomes higher than the distance determination reference value after the overhead view image is displayed on the display.

2. The rear display device according to claim 1, wherein the distance determination reference value changes in accordance with a speed of the vehicle or a speed of the object detected by the controller.

3. A rear display device comprising: a camera that is attached to a vehicle and is configured to capture rear of the vehicle; a display configured to display an image; and a controller configured: to generate an overhead view image by performing an overhead view conversion process on an image obtained by the camera; to control the display to display one of a non-overhead view image in which the overhead view conversion process is not performed on the image obtained by the camera and the overhead view image; to detect a movement state of the vehicle; to predict a reversing course of the vehicle based on the movement state of the vehicle; and to detect an object that is present within a predetermined detection range at the rear of the vehicle, wherein the controller calculates a margin time taken from current time until collision between the object and the vehicle based on a speed of the vehicle, a speed of the object, and a distance between the object and the vehicle, the controller controls the display to display the overhead view image when the object is at the reversing course and the margin time is a predetermined time determination reference value or less, the controller controls the display to display the non-overhead view image when the object is not at the reversing course or the margin time is higher than the time determination reference value, and the controller switches an image displayed on the display to the non-overhead view image after continuing to display the overhead view image on the display for a predetermined time from a time point when the object at the reversing course is not at the reversing course or the margin time is higher than the time determination reference value, after the overhead view image is displayed on the display.

\* \* \* \* \*